United States Patent [19]

Naimpally

[11] Patent Number: 5,532,748
[45] Date of Patent: Jul. 2, 1996

[54] HYBRID ANALOG/DIGITAL TELEVISION TRANSMISSION SYSTEM

[75] Inventor: Saiprasad V. Naimpally, Langhorne, Pa.

[73] Assignee: Matsushita Electric Corporation of America, Secaucus, N.J.

[21] Appl. No.: 414,334

[22] Filed: Mar. 31, 1995

[51] Int. Cl.$^6$ ............................ H04N 7/015; H04N 7/06; H04N 7/08

[52] U.S. Cl. ......................... 348/432; 348/426; 348/385; 348/554

[58] Field of Search .................................. 348/385–389, 348/432, 437, 438, 426, 469, 470, 473, 487, 554–556, 725, 558, 614; 375/260; 370/76, 69.1; H04N 7/015, 7/06, 7/08, 7/12

[56] References Cited

U.S. PATENT DOCUMENTS

| | | | |
|---|---|---|---|
| 4,864,403 | 9/1989 | Chao et al. | 358/167 |
| 5,151,779 | 9/1992 | Kanatsugu et al. | 348/438 |
| 5,287,180 | 2/1994 | White | 348/473 |
| 5,291,289 | 3/1994 | Hulyalkar et al. | 348/469 |
| 5,309,235 | 5/1994 | Naimpally | 348/476 |
| 5,313,279 | 5/1994 | Wang et al. | 348/469 |
| 5,325,127 | 6/1994 | Dinsel | 348/473 |
| 5,387,941 | 2/1995 | Montgomery et al. | 348/488 |
| 5,412,426 | 5/1995 | Totty | 348/385 |

OTHER PUBLICATIONS

Kiver and Kaufman, *Television Electronics: Theory and Service*, Chapters 7–10, pp. 159–271 (1983).

Benson and Whitaker, *Television Engineering Handbook*, Chapters 18 and 24, (1992).

Video Section of Information Technology–Generic Coding of Moving Pictures and Associated Audio ISO/IEC 13818–1 (Nov. 1994).

Systems Section of Information Technology–Generic Coding of Moving Pictures and Associated Audio ISO/IEC 13818–1 (Nov. 1994).

Hopkins, "Digital Terrestrial HDTV For North America: The Grand Alliance HDTV System", *IEEE Transactions on Consumer Electronics*, vol. 40, No. 3, pp. 185–197 (Aug. 1994).

Dr. Kamilo Feher, Adaptive Equalization, Chapter 12, *Advanced Digital Communications Systems and Signal Processing Techniques*, Prentice–Hall, Inc., pp. 652–654 (1987).

Paik et al., "A High Performance, Robust HDTV Transmission System—DigiCipher™", Proceedings of Int'l Workshop on HDTV '92, vol. 1 (1992).

*Primary Examiner*—Safet Metjahic
*Attorney, Agent, or Firm*—Ratner & Prestia

[57] ABSTRACT

A system and method for providing a video signal during the delay time between when a new channel is selected and when the digital picture is acquired and displayed is disclosed. In particular, the system provides an NTSC-like analog video signal along with a conventional digital television signal such that when a user initially makes a new channel selection, the analog video signal, which can be quickly and easily decoded, is presented for display until the digital television signal is completely decoded and acquired. As soon as the digital television signal is ready for display, the displayed signal switches from the analog video signal to the digital television signal. For purposes of conserving frequency spectrum, the analog video signal is a simple NTSC-like monochrome (i.e., black and white) signal and limited to a 1 MHz band of the available 6 MHz spectrum allocated for each channel.

20 Claims, 5 Drawing Sheets

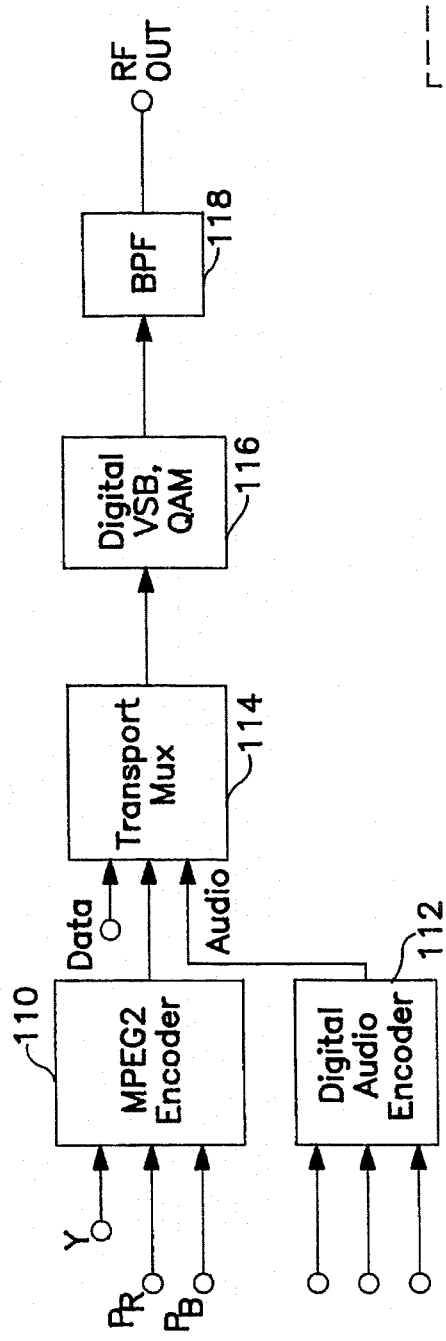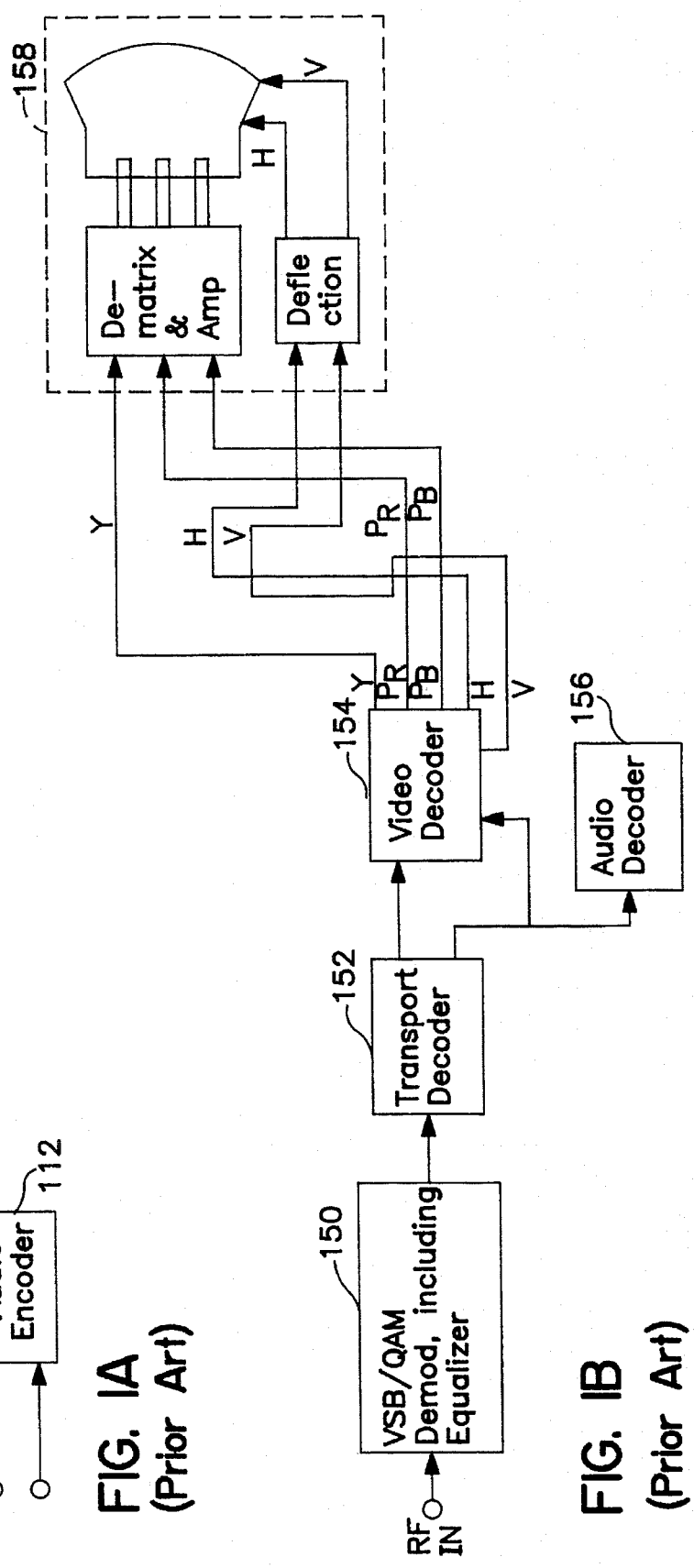
FIG. 1A (Prior Art)
FIG. 1B (Prior Art)

HYBRID ANALOG/DIGITAL TELEVISION TRANSMISSION SYSTEM

FIELD OF THE INVENTION

The present invention generally relates to digital television and, more particularly, it relates to the delay which exists between selecting a new channel and eventually acquiring a clear picture on the newly selected channel of a digital television system.

BACKGROUND OF THE INVENTION

The basics of television are well known and described in numerous publications. For example, *Television Electronics: Theory and Service*, by Kiver and Kaufman (1983), which is herein incorporated by reference, describes, among other things, the basics of conventional analog television (see Chapters 7–10, pgs. 159–271). Additionally, the Television Engineering Handbook by Benson and Whitaker (1992), which is also herein incorporated by reference, describes digital television as well as High Definition Television (HDTV) (see Chapters 18 and 24, respectively).

Digital television, in view of its many advantages, is making great progress in its attempts to replace conventional analog television. This progress is being driven by many groups and associations. One such association of companies driving digital television is known as the "Digital HDTV Grand Alliance" including members such as AT&T, Philips, David Sarnoff Research Center, Massachusetts Institute of Technology and others.

An overview of the strides made by this group are presented in an article by Robert Hopkins entitled "Digital Terrestrial HDTV for North America: The Grand Alliance HDTV System" published in the IEEE Transactions on Consumer Electronics (Summer 1994) (hereinafter "the Grand Alliance article"). This article is also herein incorporated by reference for all of its teachings regarding the background and basics of digital HDTV systems including the use of Program and Transport Packet Streams.

Although the present invention is generally applicable to digital television and not just digital HDTV, the Grand Alliance article provides background material adequate to illustrate conventional systems and the problem associated therewith. In the Grand Alliance article, FIG. 1, also reproduced herein as FIG. 5, shows a high-level functional block diagram of the Grand Alliance HDTV System encoder. As shown, a video source delivers a video signal to the video compressor where video compression is accomplished in accordance with MPEG-2 Video standard at the Main Profile/High Level. It should be noted that the same problems may exist with a High Profile/Main Level system as well.

The video encoder output is packetized in variable-length parckets of data called Packetized Elementary Stream (PES) packets. Similar processing occurs for the audio input. The video and audio PES packets, along with any ancillary data are presented to a multiplexer (also known as a Transport Mutliplexer). The output of the multiplexer is a stream of fixed-length 188-byte MPEG-2 Transport Stream packets. The MPEG-2 Transport Stream packets are presented to the modulator such as a VSB or QAM modulator where data is encoded for the channel and a modulated carrier is generated. The modulated carrier occupies a typical MPEG transmission spectrum as shown in FIG. 2.

After transmission, the signal is received and decoded and displayed on whatever channel the user has selected. In the above-described configuration, a serious drawback exists, however, such that when the user decides to change channels (also known as "channel surfing") a significant delay may occur between the time the user selects a new channel and when the digital HDTV signal for that channel is actually acquired and displayed on the screen. This delay can be as much as 1 to 2 seconds in duration and, for even the most novice channel surfers, quite annoying. This delay occurs due to the fairly complex decoding schemes implemented in a digital television receiver, during a channel change, before a quality picture can be displayed. Accordingly, it is desirable to fill the delay time with a adequate picture.

SUMMARY OF THE INVENTION

The present invention is directed to a system for including an analog video signal along with the digital television signal to produce a hybrid television signal for use during channel change including means for generating an analog television signal; and means for adding the analog television signal to the digital television signal to produce a hybrid television signal suitable for transmission within the predetermined frequency band.

In another aspect of the present invention, a system for decoding an analog video signal along with the digital television signal for use during signal acquisition including means for receiving and decoding an analog television signal; means for detecting a newly selected channel and, depending on a decoding status of the digital television signal for the newly selected channel, producing a control signal; and means, responsive to the control signal, for selecting either the analog television signal or the digital television signal to be displayed.

BRIEF DESCRIPTION OF THE DRAWINGS

The invention is best understood from the following detailed description when read in connection with the accompanying drawing, in which:

FIG. 1A shows a high-level functional block diagram of a conventional digital HDTV encoding/transmission section.

FIG. 1B shows a high-level functional block diagram of a conventional digital HDTV receiving/decoding section suitable for use with the encoding/transmission section shown in FIG. 1A.

DETAILED DESCRIPTION

Figure 2:
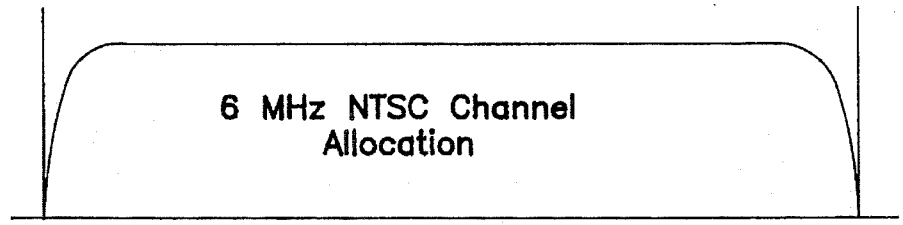
FIG. 2 shows a typical frequency spectrum for the RF output signal of the encoding/transmission section shown in FIG. 1A.

As mentioned in the BACKGROUND section, a serious drawback exists with the conventional digital television such that, when a user receiving the digital signal decides to change channels (also known as "channel surfing"), a significant delay may occur between the time the user selects a new channel and when the digital HDTV signal for that channel is actually displayed on the television screen. This delay can be as much as 1 to 2 seconds in duration and may be quite annoying.

The present invention addresses this drawback by providing an intermediate picture to fill the delay time which exists between selecting a new channel and the actual display of the signal on that channel. In the present invention, this is accomplished using a hybrid analog/digital video signal.

In particular, the present invention provides, in addition to a conventional digital television signal, an NTSC-like analog video signal such that when the user initially makes a new channel selection, the analog video signal, which can be quickly and easily acquired, is displayed until the digital television signal is completely decoded and acquired. As soon as the digital television signal is ready for display, the displayed signal switches from the analog video signal to the digital television signal. For purposes of conserving frequency spectrum, in the exemplary embodiment of the present invention, the analog video signal is a simple NTSC-like monochrome signal.

FIG. 1A shows a high-level functional block diagram of a conventional digital television encoding/transmission section. Systems like the one shown in FIG. 1A are well known in the art and described in both the *Television Engineering Handbook* and the Grand Alliance article. Encoders and transmitters of this type are in use by commercial satellite broadcasters such as DBS and VSSB.

As shown, the encoding/transmission section of the conventional digital television system includes an MPEG encoder 110 which encodes the picture data according to established MPEG standards (e.g., MPEG-1 or MPEG-2). MPEG, which is the Moving Pictures Expert Group, is a committee within the International Standards Organization (ISO). The group proposes specifications in attempts to establish various standards for the encoding of digital video and associated audio data (e.g., MPEG-2 standards formats for Transport Packet Streams). Proposed and accepted standards are periodically published, such as the Video Section of Information Technology - Generic Coding of Moving Pictures and Associated Audio ISO/IEC 13818-2 (November 1994) (hereinafter "Video Section") and the Systems Section of Information Technology - Generic Coding of Moving Pictures and Associated Audio ISO/IEC 13818-1 (November 1994) (hereinafter "Systems Section") both of which are herein incorporated by reference for their teachings regarding established standards and formats.

The syntax for the MPEG-2 standard defines several layers of data records which are used to convey both audio and video data. For the sake of simplicity, the decoding of the audio data, in the audio encoder 112, is not described herein.

Encoded data which describes a particular video sequence is represented in several nested layers, the Sequence layer, the Group of Pictures layer, the Picture layer, the Slice layer and the Macroblock layer. To aid in transmitting this information, a digital data stream representing multiple video sequences is divided into several smaller units and each of these units is encapsulated into a respective packetized elementary stream (PES) packet. For transmission, each PES packet is divided, in turn, among a plurality of fixed-length Transport Packets. This is accomplished in the Transport Multiplexer 114. Once the Transport Packets are established, they are modulated using digital VSB or QAM in modulator 116, then filtered by bandpass filter (BPF) 118. The output signal from BPF 118 represents the RF signal output from the encoding/transmitting section of the digital television system. The RF output signal, for each channel, occupies the typical 6 MHz channel allocation spectrum shown in FIG. 2.

Turning to the reception and processing of the RF signal, Figure 1B shows a high-level functional block diagram of a conventional digital television receiving/decoding section suitable for use with the encoding/transmission section shown in FIG. 1A. As shown in Figure 1B, the RF signal is received and, in essentially the reverse order in which it was encoded, it is decoded. In particular, the RF signal, representing the MPEG data stream, is demodulated by demodulator 150 with possible equalization.

Next, a Transport Decoder 152 decodes the Transport Packets to reassemble the PES packets. The PES packets, in turn, are decoded, by video decoder 154 and audio decoder 156, to reassemble the MPEG-2 bit-stream which represents the image in the layered records, as described above. This bit-stream is also converted into the appropriate information and control signals, including the luminance signal, Y, the chrominance signals U and V, and the horizontal and vertical sync signals, H-sync and V-sync, to drive the television display 158.

But, again, when a user receiving the digital signal decides to channel surf, a significant delay may occur between the time the user selects a new channel and when the digital HDTV signal for that channel is actually displayed on the television screen. This delay can be as much as 2 seconds in duration and is primarily caused by the VSB/QAM demodulation and the decoding by Transport Decoder 152, video decoder 154 and audio decoder 156.

As mentioned, the present invention addresses this shortcoming by providing an intermediate picture to fill the delay time which exists between selecting a new channel and the actual display of the signal on that channel. In particular, the present invention provides, in addition to the conventional digital television signal, an NTSC-like analog video signal such that when the user initially makes a new channel selection, the analog video signal, which can be quickly and easily acquired, is displayed until the digital television signal is completely decoded and acquired. As soon as the digital television signal is ready for display, the displayed signal switches from the analog video signal to the digital television signal.

Figure 3A:
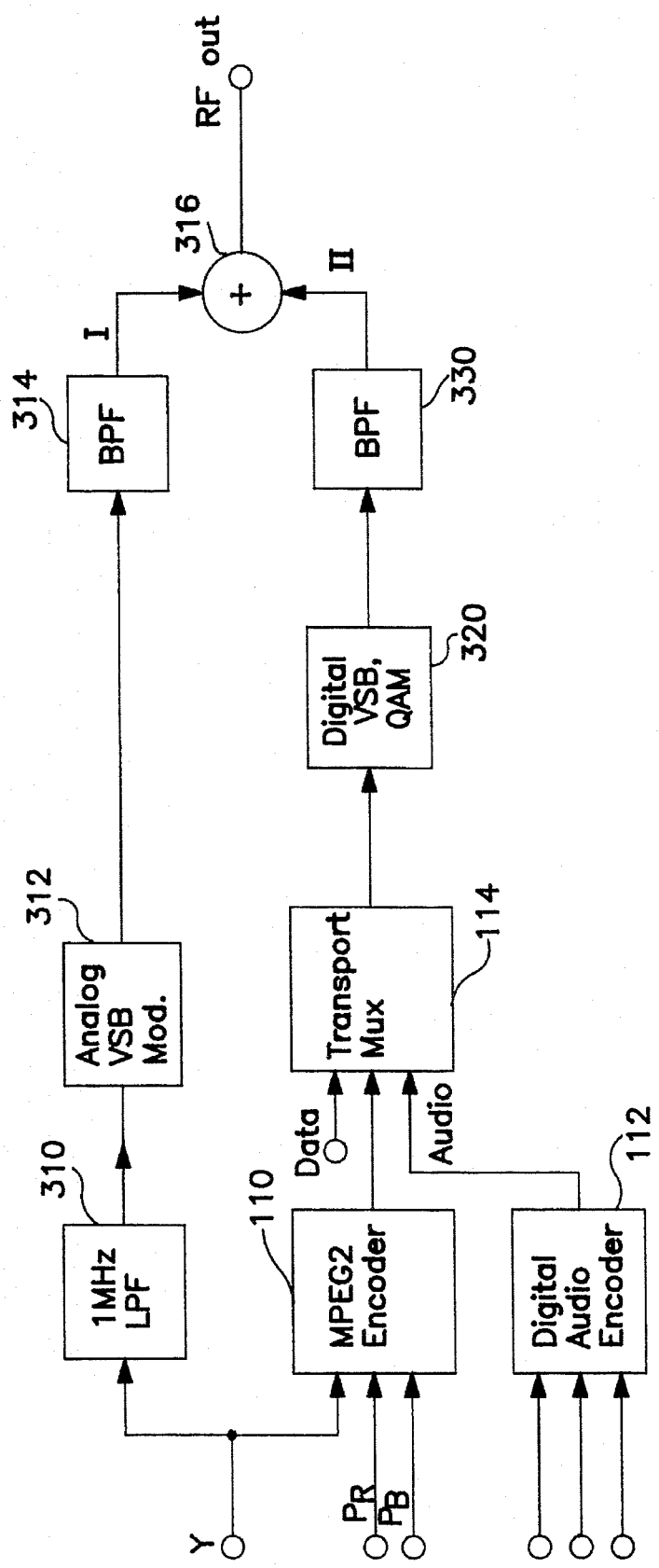
FIG. 3A shows a high-level functional block diagram of an exemplary embodiment of an encoding/transmission section of the present invention.

FIG. 3A shows a high-level functional block diagram of an exemplary embodiment of an encoding/transmission section of the present invention. In FIG. 3A, the lower portion of the encoding/transmitting section is essentially the same as the conventional digital HDTV System described with respect to FIG. 1A. Therefore, only the additions or modifications to the conventional configuration are described.

Figure 3B:
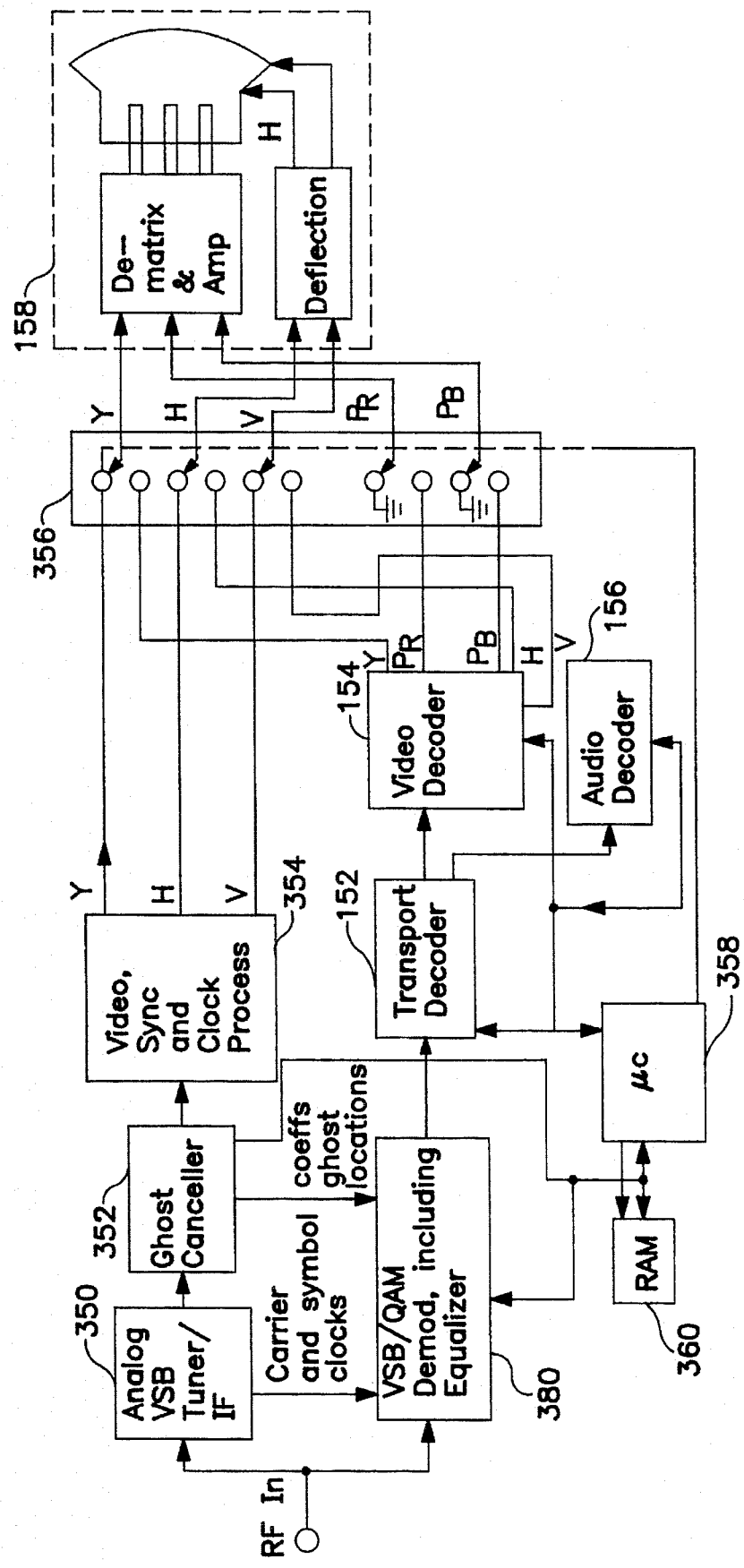
FIG. 3B shows a high-level functional block diagram of an exemplary embodiment of an encoding/transmission section of the present invention.
Figure 5:
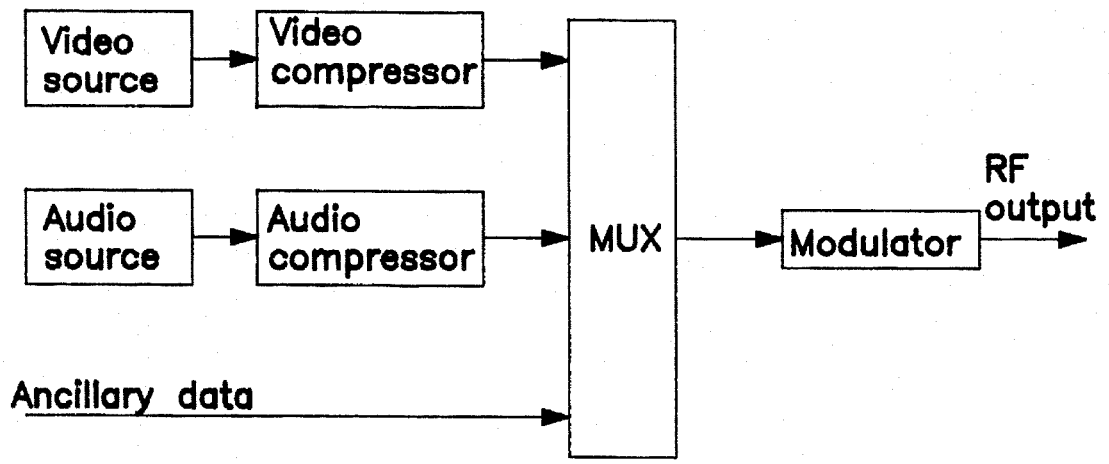
FIG. 5 shows a high-level functional block diagram of a conventional digital HDTV encoder as illustrated in the Grand Alliance article.

Referring to FIG. 3A, in addition to the conventional aspects of FIG. 3B, an analog video signal, similar to a simple NTSC-like monochrome signal, is generated. In particular, the luminance signal Y is input to a 1 MHz low pass filter (LPF) 310. In the exemplary embodiment of the present invention, a 1 MHz LPF is used because the analog video signal is limited to 1 MHz of the available 6 MHz allocated for each channel. It should be noted that 1 MHz is approximately the same resolution as the signal provided by a VHS video recorder.

Figure 4:
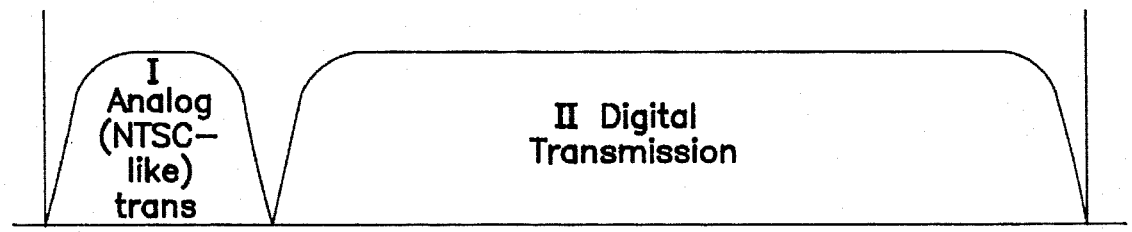
FIG. 4 shows an exemplary frequency spectrum for the RF output signal of the encoding/transmission section of the present invention shown in FIG. 3A.

An exemplary placement of the analog signal in the 6 MHz spectrum is shown in FIG. 4. Those skilled in the art, however, will appreciate that were the analog video signal located elsewhere in the available spectrum, a different type of filter would be used corresponding to the relative positioning of the analog signal within the available spectrum.

It should be noted that, although the modulator 320 and BPF 330 of FIG. 3A are similar to their respective counterparts in FIG. 1A, since the digital signal will no longer occupy the entire 6 MHz channel allocation, the modulation and filtering are fashioned accordingly. For example, in the exemplary embodiment of the present invention, the digital signal occupies only 5 MHz of the 6 MHz available, thus, BPF 330 would have to be designed to accomodate the 5 MHz band selected for transmitting the digital signal. As would be appreciated by those skilled in the art, similar modifications are also desirable in the receiving/decoding section of the present invention (e.g., demodulator 380).

Continuing with FIG. 3A, once the signal is filtered, the filtered signal is input to a typical analog vestigial side-band (VSB) modulator 312. As mentioned, processing of analog television components, especially monochrome television signals, are well known, thus, the particular details of such are omitted.

After being modulated, the analog signal is again filtered in bandpass filter (BPF) 314 to ensure relatively little interference is being added to the otherwise conventional digital television signal at adder 316.

Filtering techniques are well known. For example, U.S. Pat. No. 5,309,235, directed to transmitting digital data in the overscan portion of a television signal discusses filtering techniques suitable for use with the present invention. Accordingly, U.S. Pat. No. 5,309,235 is herein incorporated by reference for its teachings relating to filtering techniques as well as other television signal processing such as QAM techniques.

Continuing with FIG. 3A, the spectrum of the RF output of the encoder/transmitter shown in FIG. 3A is shown in FIG. 4. As seen, the analog video signal occupies the first 1 MHz of the available spectrum while the conventional digital television signal occupies the remainder of the available 6 MHz spectrum.

Thus, in the exemplary embodiment of the present invention, every video program is encoded in digital compressed form as well as a black and white (Y only) NTSC signal. The NTSC signal is analog VSB modulated similar to current NTSC but with a 1 MHz bandwidth. The digitally compressed signal is transmitted in the remaining 5 MHz band out of the total 6 MHz standard bandwidth. Therefore, upon a channel change, the 1 MHz analog signal can be quickly (e.g., ~ 150 ms) acquired and displayed; thereby, satisfying the channel surfers.

Turning to the decoding/receiving aspect of the present invention, FIG. 3B shows a high-level functional block diagram of an exemplary embodiment of an encoding/transmission section of the present invention. Like the encoder, a section of the decoder is essentially the same as that in the conventional receiving/decoding section shown in Figure 1B.

As shown in FIG. 3B, analog demodulation occurs in parallel with the conventional digital television signal demodulation and decoding. In particular, the analog demodulation includes a analog VSB Tuner/IF 350, a ghost canceller 352 and a video, sync and clock processor 354. The process of demodulating the black and white analog signal is much faster than that of the digital television signal. Accordingly, when a channel is initially selected by a user, a multiplexer 356 (e.g., switching circuit) is controlled to select the analog signal and pass it through to the CRT 158 for display. This selected analog signal is displayed until the digital television signal is decoded and acquired. The timing related to the decoding status of the digital television signal (e.g., when the HDTV signal is available) is determined by a microprocessor 358 which, in turn, changes the select input to the multiplexer 356 such that it now passes the decoded digital television signal.

It should be noted that providing the analog signal in addition to the digital television signal has additional benefits such as providing helpful information to the digital signal processing regarding ghost cancellation and/or channel analysis. For example, a ghost cancellation reference (GCR) signal can be sent in the VBI of the analog signal. Consequently, the analog receiver portion could characterize the frequency response of the channel for the purpose of locating ghosts at 1 µs resolution. This information can be stored in a memory such as RAM 360 and supplied to digital channel equalizer (included in functional block 150) to speed up the digital acquisition. An example of a ghost cancellation device suitable for use with the present invention is described in U.S. Pat. No. 4,864,403 which is herein incorporated for its teachings regarding ghost cancellation and channel analysis.

Moreover, in addition to ghost cancellation, the digital carrier and symbol clocks could be quickly synchronized by supplying a ÷M,N version of the carrier and symbol clocks as a reference signal in the analog television signal. The "a ÷M,N version" is an analog oscillatory signal which is the digital television carrier ÷M and the symbol clock for the QAM modulated video signal ÷N. As mentioned, the analog version could be used as a reference to recover these clock signals for the digital television signal quickly.

Although the invention is illustrated and described herein as embodied in a method and apparatus for providing an intermediate video signal to fill the delay time between a new channel selection and when the digital picture is acquired and displayed, the invention is not intended to be limited to the details shown. Rather, various modifications may be made in the details within the scope and range of equivalents of the claims and without departing from the spirit of the invention.

What is claimed:

1. An encoding/transmission system for providing a video signal to occupy a delay time defined from when a user selects a new channel to when a digital video signal is decoded, acquired and displayed comprising:

means for receiving a signal representative of a video signal and for Converting said signal representative of a video signal into a digital video signal occupying a first predetermined band of frequencies;

means for receiving the signal representative of the video signal and for providing an analog video signal therefrom, said analog video signal occupying a second predetermined band of frequencies exclusive of the first band of frequencies; and means for combining the analog video signal with the digital video signal, wherein the analog and digital video are spectrally separate, to produce a hybrid video signal suitable for transmission within a conventional single channel frequency spectrum allocation.

2. The encoding/transmission system of claim 1, wherein the first predetermined band of frequencies has approximately a 5 MHz bandwidth.

3. The encoding/transmission system of claim 1, wherein the second predetermined band of frequencies has approximately a 1 MHz bandwidth.

4. An encoding/transmission method for providing a video signal to occupy a delay time defined from when a user selects a new channel to when a digital video signal is decoded, acquired and displayed comprising the steps of:

receiving a signal representative of a video signal and converting said signal representative of a video signal into a digital video signal occupying a first predetermined band of frequencies;

receiving the signal representative of the video signal and providing an analog video signal therefrom, said analog video signal occupying a second predetermined band of frequencies spectrally separate from the first predetermined band; and combining the analog video signal to the digital video signal to produce a hybrid video signal suitable for transmission within a conventional single channel frequency spectrum allocation.

5. The encoding/transmission method of claim 4, wherein the first predetermined band of frequencies has approximately a 5 MHz bandwidth.

6. The encoding/transmission method of claim 4, wherein the second predetermined band of frequencies has approximately a 1 MHz bandwidth.

7. A receiving/decoding system for providing a video signal to occupy a delay time defined from when a user selects a new channel to when a digital video signal is decoded, acquired and displayed comprising:

means for receiving and decoding the digital video signal transmitted in a first predetermined band of frequencies;

means for receiving and decoding an analog video signal transmitted in a second predetermined band of frequencies;

means for detecting a new channel selection and, depending on a decoding status of the digital video signal for the newly selected channel, producing a control signal; and means, responsive to the control signal, for selecting either the analog video signal or the digital video signal to be displayed.

8. The receiving/decoding system of claim 7, wherein the first predetermined band of frequencies has approximately a 1 MHz bandwidth.

9. The receiving/decoding system of claim 7, wherein the second predetermined band of frequencies has approximately a 5 MHz bandwidth.

10. The receiving/decoding system of claim 7, wherein the means for selecting is a switching circuit.

11. The receiving/decoding system of claim 7, wherein the means for receiving and decoding an analog video signal includes a ghost cancellation means for providing ghost cancellation information to the means for receiving and decoding the digital video signal.

12. A receiving/decoding method for providing a video signal to occupy a delay time defined from when a user selects a new channel to when a digital video signal is decoded, acquired and displayed comprising the steps of:

providing the digital video signal and a analog signal together in a conventional single channel frequency spectrum allocation;

receiving and decoding the digital video signal transmitted in a first predetermined band of frequencies within the single channel allocation;

receiving and decoding the analog video signal transmitted in a second predetermined band of frequencies within the single channel allocation;

detecting a newly selected channel and, depending on a decoding status of the digital video signal for the newly selected channel, producing a control signal; and selecting, in response to the control channel, either the analog video signal or the digital video signal to be displayed.

13. The receiving/decoding method of claim 12, wherein the first predetermined band of frequencies has approximately a 1 MHz bandwidth.

14. The receiving/decoding method of claim 12, wherein the second predetermined band of frequencies has approximately a 5 MHz bandwidth.

15. A system for providing a video signal to occupy a delay time defined from when a user selects a new channel to when a digital video signal is decoded, acquired and displayed comprising:

an encoding/transmission means including:
    means for providing the digital video signal in a first predetermined band of frequencies;
    means for providing an analog video signal in a second predetermined band of frequencies exclusive of the first predetermined band; and
    means for combining the analog video signal to the digital television signal to produce a hybrid video signal suitable for transmission within a conventional single channel frequency spectrum allocation;

a receiving/decoding means including:
    means for receiving and decoding the digital video signal;
    means for receiving and decoding the analog video signal;
    means for detecting a newly selected channel and, depending on a decoding status of the digital video signal for the newly selected channel, producing a control signal; and
    means, responsive to the control signal, for selecting either the analog video signal or the digital video signal to be displayed.

16. The system of claim 15, wherein the first predetermined band of frequencies has approximately a 1 MHz bandwidth.

17. The system of claim 15, wherein the second predetermined band of frequencies has approximately a 5 MHz bandwidth.

18. The system of claim 15, wherein the means for selecting is a switching circuit.

19. The system of claim 15, wherein the means for receiving and decoding an analog video signal includes a ghost cancellation means for providing ghost cancellation information to the means for receiving and decoding the digital video signal.

20. The system of claim 15, wherein the analog video signal is a monochrome signal.

* * * * *